United States Patent [19]

Warmann

[11] 4,004,680
[45] Jan. 25, 1977

[54] CONVEYOR PUSHER MECHANISM

[76] Inventor: Bruno D. Warmann, 15362 Fairlane Drive, Livonia, Mich. 48154

[22] Filed: Sept. 22, 1975

[21] Appl. No.: 615,398

[52] U.S. Cl. .......................... 198/732; 104/172 B
[51] Int. Cl.² ......................................... B65G 19/00
[58] Field of Search .......... 198/160, 168, 170, 172, 198/173; 104/162, 172 B, 172 S, 172 C, 96

[56] References Cited
UNITED STATES PATENTS

| 3,623,538 | 11/1971 | Wakabayashi et al. | 104/172 S |
| 3,799,327 | 3/1974 | Schulz | 104/172 B |
| 3,837,289 | 9/1974 | Marshman et al. | 104/172 B |

FOREIGN PATENTS OR APPLICATIONS

| 1,194,325 | 6/1965 | Germany | 104/172 B |

Primary Examiner—Johnny D. Cherry
Assistant Examiner—Joseph E. Valenza
Attorney, Agent, or Firm—Basile, Weintraub and Vanophem

[57] ABSTRACT

In a conveyor system for forwarding trays along a support, the trays are engaged by pusher mechanisms attached to an endless driven chain supported on a track adjacent to the tray's support. Each pusher mechanism has a pivotally mounted pusher member that is associated with a pivoted control member located forwardly of the pusher member and connected thereto by a horizontally sliding connecting member. The pusher member and the control member are normally urged to positions in which the pusher member is drivingly engageable with a tray and the control member is engageable with an object such as a preceding tray overtaken by the control member; such engagement resulting in movement of the pusher member to a non-driving position and enabling trays to be stopped and accumulated. The pusher member may be moved to an inoperative position by means of a second control member, operable upon contact with selectively spaced ramps which force the second control member to rotate in such a manner as to slide the horizontal member to a position which results in the pusher member being inoperative.

13 Claims, 8 Drawing Figures

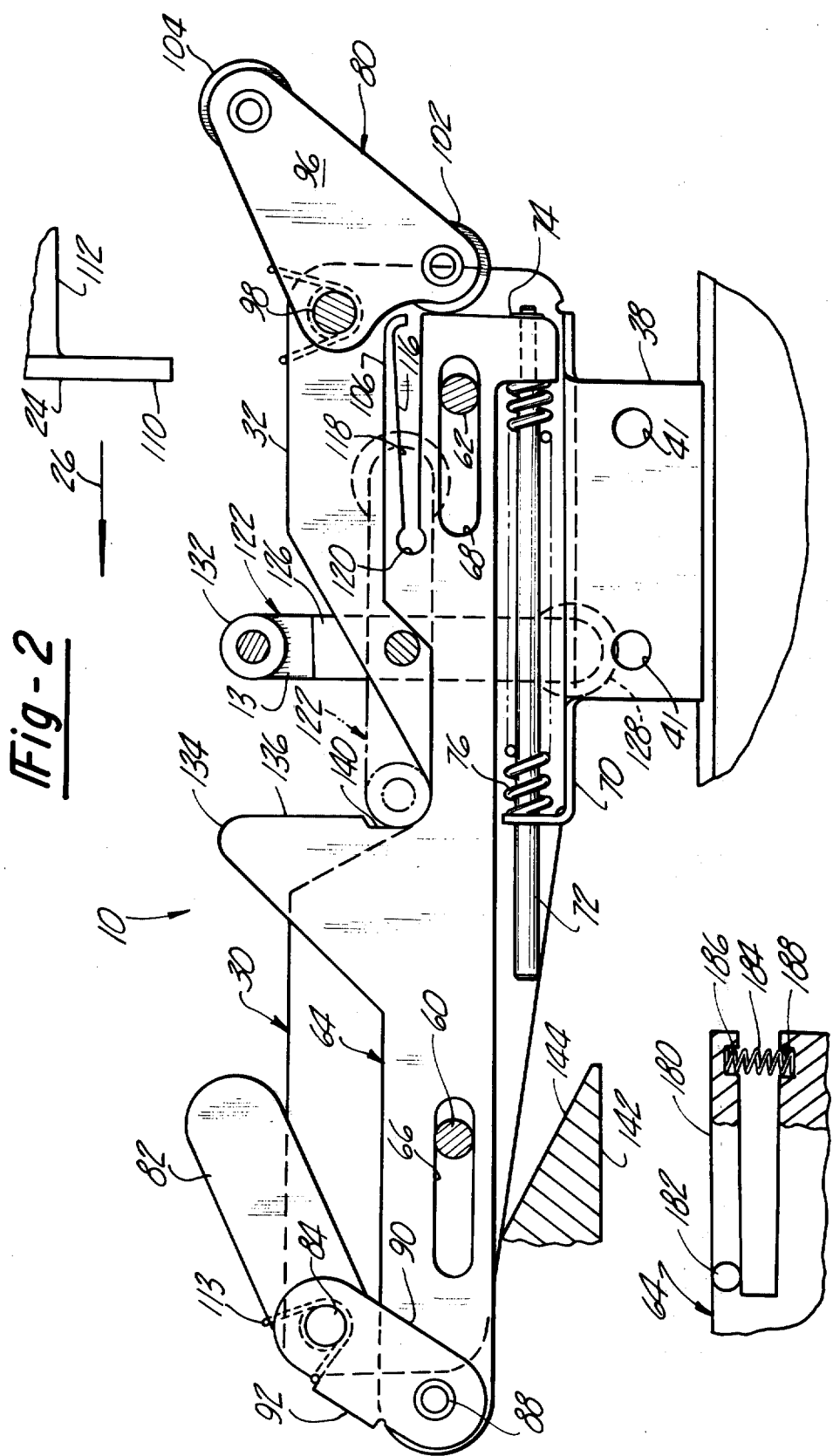

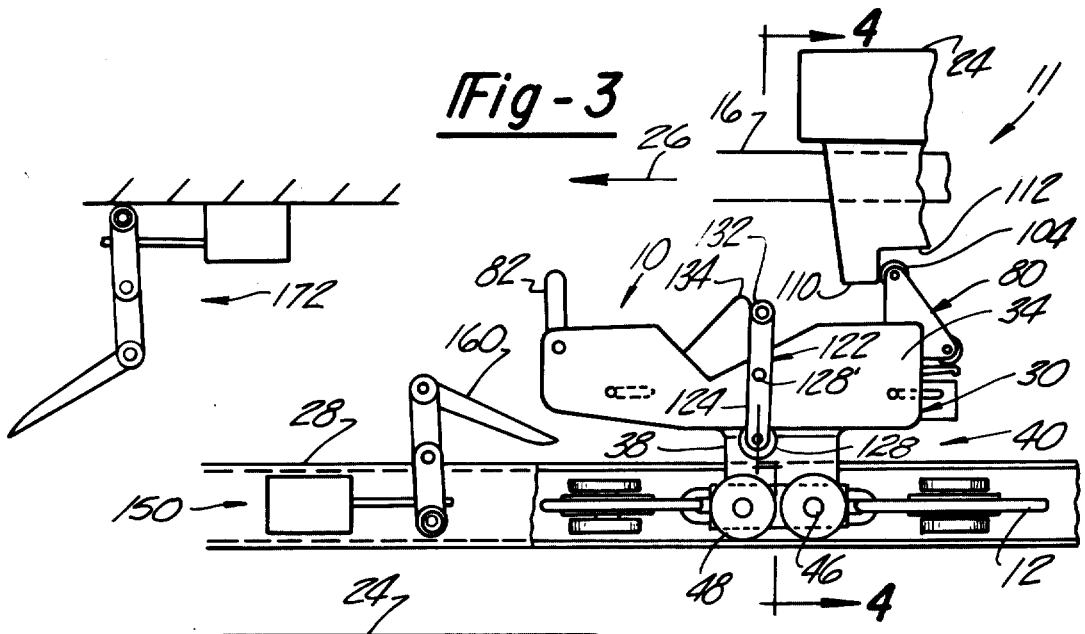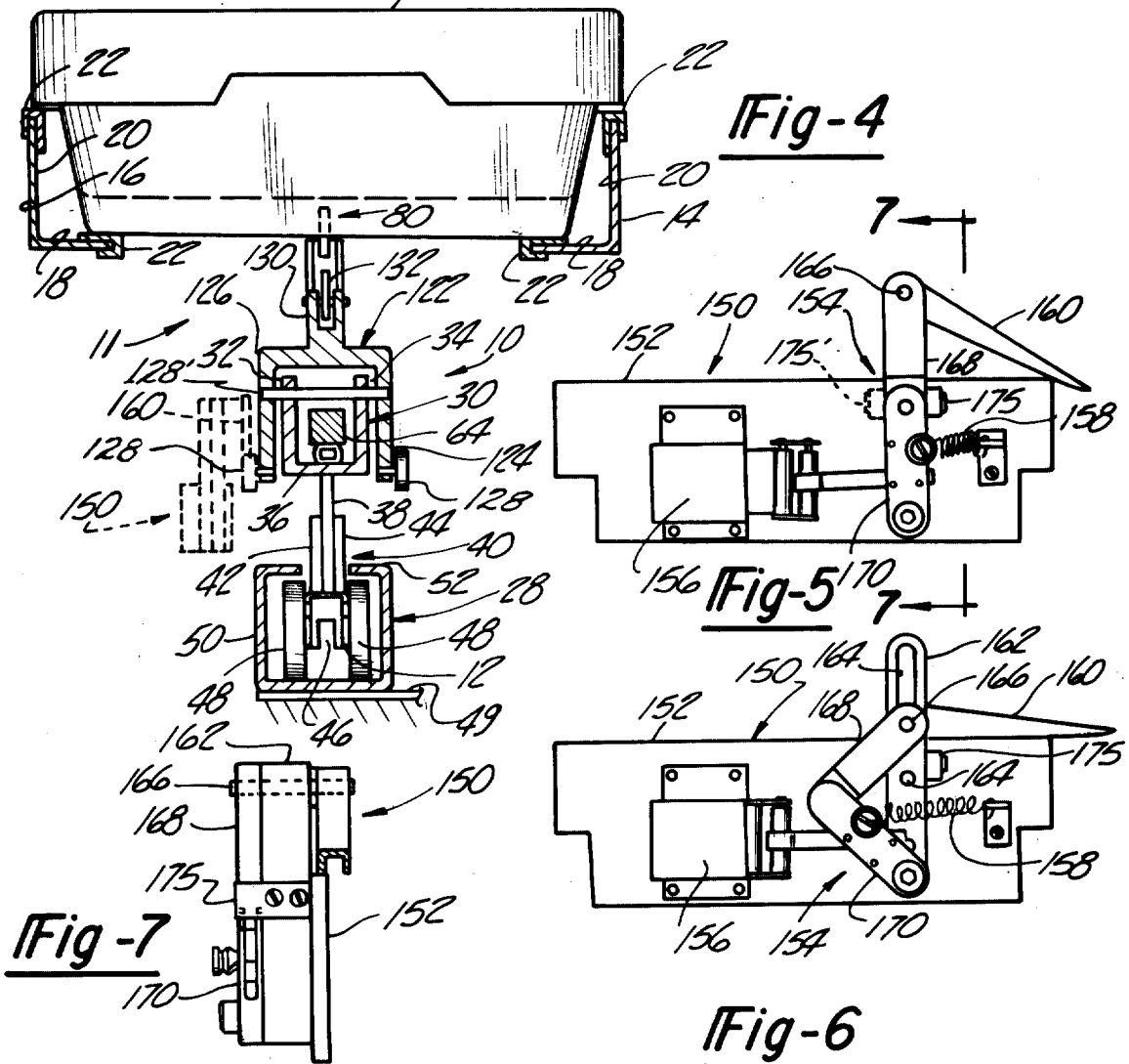

CONVEYOR PUSHER MECHANISM

BACKGROUND OF THE INVENTION

I. Field of the Invention

The present invention relates to conveyor systems including a support providing a path along which trays are movable in a forwarding direction and, in particular, the present invention relates to pusher members for drivingly engaging such trays and moving the same.

II. Description of the Prior Art

The prior art contains numerous examples of accumulating conveyor systems, and examples of such systems are disclosed in U.S. Pat. Nos. 1,742,789; 2,635,555; 2,645,186; 2,741,190; 2,961,973; 3,099,228; 3,434,431; 3,437,054; 3,559,586; 3,623,538; 3,661,094; 3,799,327; 3,837,289; USSR Pat. No. 250,031; and German Pat. No. 1,194,325. Two of the aforementioned patents, namely, United States Letters Patent Nos. 3,799,327 and 3,837,289, disclose conveyor systems and pusher mechanisms which, in the opinion of the inventor, represent the closest prior art known to the inventor. These patents disclose conveyor systems that have plural endless and independently powered conveyor chains, which travel on individual guide tracks traversing the entire length of the system, and one or more further and similar chain and track-type branch lines which, at spaced zones there along, converge and diverge in relationship to the main line. Trays are moved along the tracks by means of pusher members or dogs attached to the endless driven chain. In certain of the aforementioned patents the pusher member is pivotally mounted and associated with a pivoted control member located forwardly of the pusher member and connected thereto by a link, the two members being normally urged to positions in which the pusher member is drivingly engageable with the tray and the control member is engageable with an object such as the preceding tray overtaken by the control member. Such engagement results in movement of the pusher member to a non-driving position and enables trays to be stopped and accumulated. In both of the last two aforementioned patents the connection between the control member and the pusher member is accomplished by means of a toggle arrangement that generally comprises a link having at least one end pivotally connected to a body of the pusher mechanism and its other end having a connection with the pusher member, whereby the pusher member can be releasably locked in an operative position and moved therefrom in conjunction with the swinging motion of the link, while suitable means are provided for connecting the link with the control member, whereby movement of the control member out of its raised position imparts a swinging motion to the link and, thus, brings the pusher member to an inoperative position. In both of the aforementioned patents a cam follower is secured to the control member and is selectively engageable with movable cam tracks. One type of cam track so disclosed produces movement of the pusher member to a non-driving position, when engaged by the cam follower, and is combined with an abutment for stopping the tray being driven by the pusher member.

While each of the aforementioned United States patents disclose conveyor and pusher mechanisms which have performed in a generally satisfactory manner, the use of the toggle-type linkages presents problems in its practical applications; and, as such, it would be desirable to provide a pusher mechanism which requires neither the toggle-type linkage or the cam followers as a means for selectively moving the pusher mechanism between an operative and an inoperative position.

SUMMARY OF THE INVENTION

The present invention, which will be described subsequently in greater detail, comprises pusher mechanisms for a conveyor of the type that includes a support providing a path along which trays are movable in a forwarding direction wherein each tray is drivingly engageable by one of a plurality of said pusher mechanisms. The pusher mechanisms are carried by a chain supported on a track located adjacent to the tray support. Each pusher mechanism has a pusher member that is pivotally mounted on a bracket which, in turn, is attached to the chain and is movable between driving and non-driving positions relative to the tray; that is, the pusher member is so movable as to permit trays to be selectively stopped and accumulated or permit trays to be positively propelled. In the construction of the inventive concept a control member is associated with each pusher member, with the control member being pivotally mounted in advance of the pusher member with relation to the forwarding direction of tray movement. The pusher member is connected to the control member by means of a horizontally slidably disposed connection member, which in a first position activates the pusher member and in a second position deactivates the same. Positioning of the connecting member is a function of the independent positioning of two separate control members.

It is therefore an object of the present invention to provide a new and improved pusher mechanism for conveyor systems of the type described.

Other objects, advantages, and applications of the present invention will become apparent to those skilled in the art of conveyor systems and pusher mechanisms for such conveyor systems when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 2 is a longitudinal cross-sectional view similar to FIG. 1 showing the pusher mechanism with the pusher member in a non-operative position;

FIG. 3 is a fragmentary schematic side elevational view of a chain-powered conveyor arranged to propel successive trays with the pusher mechanism being in a dogged condition just prior to being automatically dedogged by contact with a barrier actuating mechanism;

FIG. 4 is a fragmentary cross-sectional view of the pusher mechanism taken along Line 4—4 of FIG. 3;

FIG. 5 is an enlarged side elevational view of the barrier actuating mechanism shown in FIG. 3 and illustrated in a de-dogging position;

FIG. 6 is a side elevational view of the barrier actuating mechanism shown in FIG. 5 and illustrated in an inoperative position;

FIG. 7 is a fragmentary cross-sectional view of the barrier actuating mechanism taken along Line 7—7 of FIG. 5; and FIG. 8 is an alternate embodiment of the pusher mechanism.

DESCRIPTION OF THE PREFERRED EMBODIMENT

Figure 1:
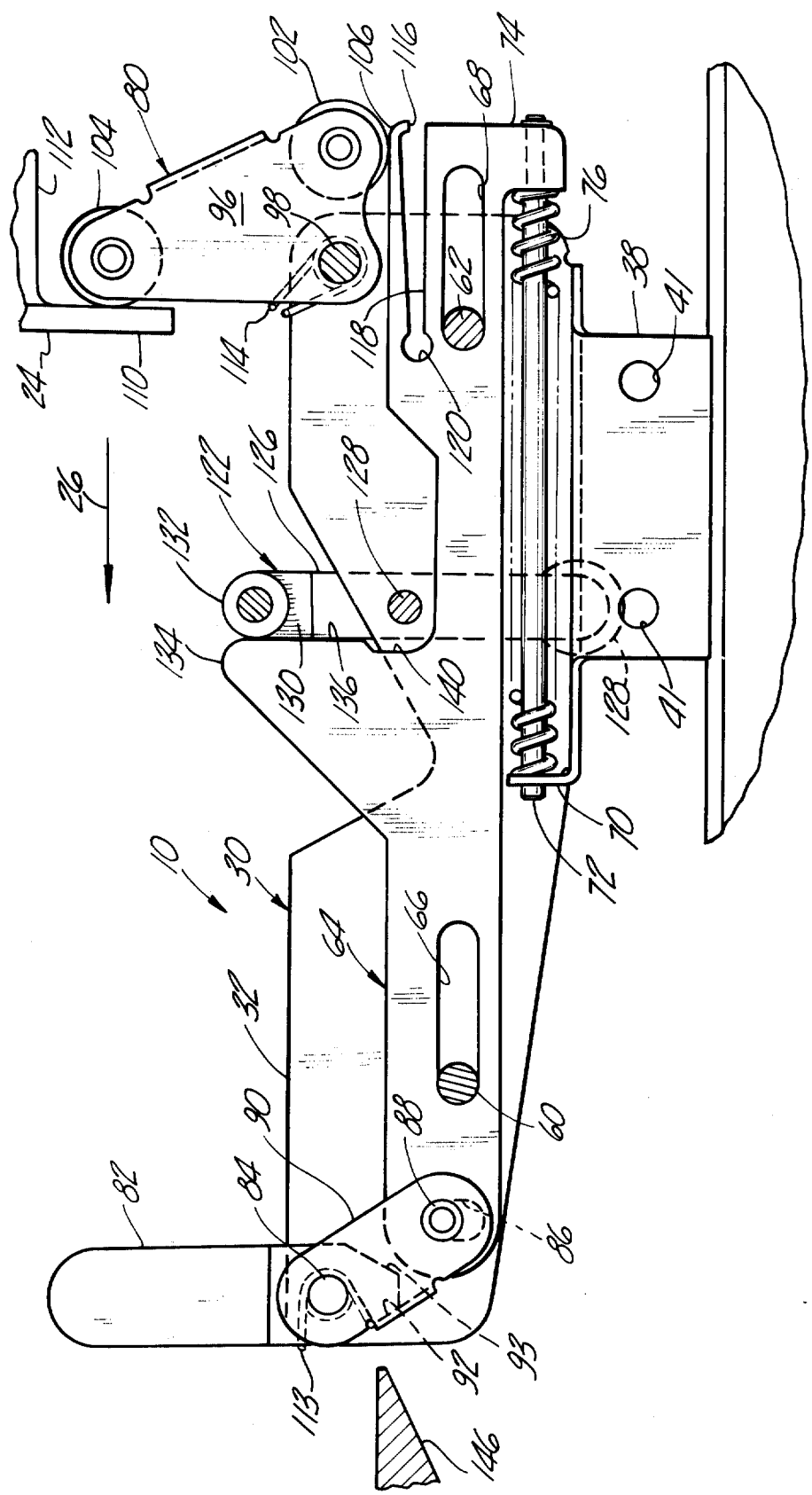
FIG. 1 is a longitudinal cross-sectional view of a portion of a pusher mechanism constructed in accordance with the principles of the present invention, the pusher mechanism including a pusher member in driving engagement with a tray.

Referring now to the drawings and, in particular, to FIG. 3 wherein there is illustrated one example of the present invention in the form of an improved conveyor pusher mechanism 10 which is one of a plurality of such pusher mechanisms that are continuously propelled along the length of a conveyor system 11 under the propulsion of a driven endless chain 12, which will be described in greater detail hereinafter.

Referring now to FIGS. 3 and 4, the conveyor system 11 comprises a pair of parallel transversely spaced angle members 14 and 16, each having a horizontal supporting surface 18 and a vertical guiding surface 20 preferably equipped with wear strips 22. The conveyor support provides a path along which trays 24 are movable in a forwarding direction, as indicated by the arrow 26 in FIG. 3. Each tray 24 is drivingly engageable by one of the plurality of pusher members 10 carried by the driven chain 12 which, in turn, is supported within a track 28 located adjacent to and beneath the tray support. As will be described hereinafter in greater detail, each pusher mechanism 10 comprises a housing 30 including upright side walls 32 and 34 connected at their bottom edges by a base 36 having an upright flange 38 that is connected to the driven chain 12 by means of a trolley 40. The lower edge of the upright flange 38 has a pair of apertures 41 (FIG. 1) through which suitable fastening members (not shown), such as bolts, extend for connecting the upright flange 38 to a pair of parallel plates 42 and 44 which mount traverse axles 46 of a pair of trolley rollers 48. The trolley rollers 48 will run in the interior of the aforementioned track 28. The track 28 is generally U-shaped in cross section and has upright walls 50 that are inwardly flanged at 52 to exert a downward restraining action on the trolley rollers 48. The tracks 28 are ordinarily rigidly supported in an elevated position by a suitable support structure 49. A more detailed description of the track 28 and driven chain 12 and examples of conveyor layouts may be had by reference to the aforementioned United States Letters Patent Nos. 3,799,327 and 3,837,289; and, thus, a more detailed description of the conveyor tracks is not necessary.

Referring now to FIGS. 1 and 2, wherein the pusher mechanism 10 is, respectively, illustrated in an operative and inoperative position. The pusher mechanism housing 30 carries a pair of horizontally disposed support pins 60 and 62 which, in turn, slidably support a connecting member 64. The connecting member 64 has a pair of elongated slots 66 and 68 through which the support pins 60 and 62, respectively, extend to support the connecting member 64 for a reciprocal movement along the longitudinal axis of the housing 30. The lower portion of the housing 30 has a bracket 70 which slidably supports one end of a spring support post 72, the other end of which is carried by a flange 74 at the right end of the connecting member 64. A spring 76, disposed around the spring support post 72, exerts a biasing force against the connecting member 64 to urge the same rightwardly such that the left ends of the slots 66 and 68 are in abutment, respectively, with the support pins 60 and 62 for maintaining a pusher member 80 in an operative position, as illustrated in FIG. 1 and which will be described in greater detail hereinafter. The pusher mechanism 10 further comprises a main control member 82 which is pivotally mounted to the forward end of the housing 30 by means of a suitable support pin 84.

The forward end of the connecting member 64 has a slotted portion 86 which slidably supports a coupling pin 88 which, in turn, is attached to one end of a link member 90. The opposite end of the link member 90 is pivotally attached to the support pin 84. The link member 90 has a lateral flange 92 which is engageable by the lower end 93 of the main control member 82 such that, when the main control member 82 is rotated clockwise as viewed in FIGS. 1 and 2, the lower end 93 of the main control member 82 will engage the flange 92 of the link member and rotate the same clockwise around the pin 84 shifting the connecting member 64 to its forward position wherein the right ends of the slots 66 and 68, respectively, are moved toward the support pins 60 and 62 and the pusher member 80, as will be described hereinafter, is lowered to an inoperative position as illustrated in FIG. 2. When the external force acting on the main control member 82 has been removed, the action of the spring 76 urging the connecting member 64 rightly will move the same to the position illustrated in FIG. 1 moving the pusher member 80 and the main control member 82 to their raised operative positions.

As can best be seen in FIGS. 1 and 2, the pusher member 80 comprises a triangularly-shaped plate member 96 that is swingable on a transverse journal shaft 98 extending through an aperture in one corner of the plate member 96 and carried by the side walls 32 and 34 of the pusher mechanism housing 30. The remaining corners of the plate 96 rotatably support rollers 102 and 104. When the connecting member 64 is shifted rightwardly under the bias of the spring 76, the roller 102 of the pusher member 80 engages the upper support surface 106 of the connecting member 64 and is raised to an operative position, as shown in FIG. 1. When the connecting member 64 is shifted to the left to the position illustrated in FIG. 2 under the action of the main control member 82 in the aforementioned manner and the support surface 106 of the connecting member 64 is removed from beneath the pusher member roller 102, the pusher member will rotate about the journal shaft 98 to an inoperative position.

In the operative position illustrated in FIGS. 1 and 3 of the drawings, the roller 104 of the pusher member 80 is engageable with an abutment 110 on the tray 24 formed by a recess 112 on the bottom of the tray 24 to drive the tray 24 forwardly along the conveyor support. In the operative mode, illustrated in FIG. 1, the main control member 82 projects into the path of travel of the trays 24 defined by the conveyor support and is engageable with a preceding tray overtaken by the control member 82. Upon engaging an overtaken tray, the control member 82 is movable from the operative position illustrated in FIG. 1 to the inoperative position illustrated in FIG. 2. In response to this clockwise rotation of the main control member 82, the connecting member 64 is shifted leftwardly under the action of the link member 90, and the removal of the support surface 106 from beneath the pusher member roller 102 results in the clockwise swinging movement of the pusher member 80 to move the pusher member 80 to a non-driving position. Once the main control member 82 has cleared the aforementioned preceding tray, the action of the spring 76 on the connecting member 64 will shift the same rightwardly, as viewed in FIG. 1, to return the main control member 82 and the pusher member 80 to their upright, operable positions.

The main control member 82 is provided with suitable biasing means such as a spring 113 which functions to bias the main control member 82 to the upright position illustrated in FIG. 1. For a reason which will be described hereinafter, the main control member may be rotated counterclockwise about the support pin 84. Similarly, the pusher member 80 is provided with a biasing means such as a spring 114 which normally urges the pusher member 80 in a clockwise direction. The spring 114 moves the pusher member 80 to the inoperative position when the support surface 106 has been withdrawn by the leftward movement of the connecting member 64. In the event an object such as a tray overtakes the pusher mechanism 10 and engages the pusher member 80, the same will move against the bias of the spring 114 in a counterclockwise direction to permit the passage of the tray thereby. In the same manner, abutment of the object against the rear side of the main control member 82 will cause the same to rotate counterclockwise against the bias of the spring 113 to permit the object to pass thereby. Once the object has moved beyond the pusher mechanism 10, the springs 113 and 114 will rotate the pusher member 80 and the control member 82 back to their upright positions. This counterclockwise rotation of the main control member 82 and the pusher member 80 permits the passage thereover of trays in the event the conveyor chain 12 becomes intentionally or unintentionally halted. It should be noted that the right end of the connecting member 64 which defines the support surface 106 is in the form of a cantilevered beam spring 116 defined by a longitudinal notch 118 extending from the rear end of the connecting member 64 and terminating in a circular slot 120. The cantilevered beam spring 116 functions as a spring to absorb the initial impact energy when the pusher member 80 contacts a load such as the tray 24.

An alternate method for moving the pusher member 80 to an inoperative position is provided by means of a secondary control member 122 (FIG. 4). The secondary control member 122 comprises a yoke portion having a pair of legs 124 and 126 which are pivotally mounted to the housing 30 on a transverse shaft 128' that extends through the side walls 32 and 34 of the housing 30 and into engagement with the yoke legs 124 and 126. The lower portion of each leg 124 and 126 of the secondary control member 122 rotatably mounts rollers 128 for a purpose to be described hereinafter. The upper portion of the control member 122 is in the form of a fork member 130 that extends from the upper portion of the yoke and rotatably supports a third roller 132.

As can best be seen in FIG. 1, the horizontally movable connecting member 64 is provided with an upright projection 134 having a vertical contact surface 136 that is engageable by the roller 132 of the secondary control member 122. As can be seen in FIGS. 1 and 2, when the secondary control member 122 is rotated in a counterclockwise direction, the control member roller 132 engages the surface 136 of the connecting member projection 134 and shifts the connecting member 64 leftwardly until control member 122 is in the horizontal position and the connecting member control surface 106 is moved out from its supporting engagement with the pusher member roller 102, whereby the pusher member 80 is rotated clockwise by spring 114 to its inoperative position, as illustrated in FIG. 2. When the secondary control member 122 is raised to the vertical position illustrated in FIG. 1, the action of the spring 76 acting on the connecting member 64 will shift the connecting member 64 rightwardly to raise the pusher member 80 to its operative position, as hereinbefore described. As can best be seen in FIG. 2, when the roller 132 of the secondary control member 122 drops into a recess 140 below the contact surface 136 of the connecting member projection 134, the roller 132 becomes locked into position with the connecting member 64 to retain the connecting member 64 in an inoperative position. To return the mechanism 10 to its normal operating position, a downward external force must be applied to the control member roller 128 to move the roller 132 out of the recess 140 and onto the contact surface 136, at which time the action of the spring 76 acting on the connecting member 64 will urge the roller 132 to move along the contact surface 136 until the control member 122 has reached its normal vertical position.

The secondary control member 122 can be rotated in a counterclockwise direction to shift the connecting member 64 to an inoperative position by any one of several means. For example, a force may be applied to the rollers 128 by means of a fixed barrier 142 (FIG. 2) disposed in the path of travel of the rollers 128 such that, as the chain 12 is driving the pusher mechanism along the track 28, the rollers 128 will engage the surface 144 of the fixed barrier 142; and the rollers 128 will follow the surface 144 a sufficient distance to cause the secondary control member to rotate 90 degrees whereby the roller 132 will engage the recess 140 of the projection 134 and shift the connecting member 64 to its inoperative position, as described hereinabove. The downward force of the roller 128 can be exercised through a second fixed barrier which would be positioned in the path of the roller 128 when the same is in its fully elevated position, such as shown schematically at 146 in FIG. 2. The fixed barrier 146 would be in the path of the roller 128 only when it is located in its fully elevated position, as illustrated in phantom lines in FIG. 2.

In certain applications it may be desirable to selectively position barriers in the path of the rollers 128 so as to selectively shift the connecting member 64 from an operative to an inoperative position and return the same to an operative position as required. This may be accomplished by means of the barrier actuation mechanism 150 illustrated in FIGS. 3–7 of the drawings. The barrier actuation mechanism 150 comprises a support plate 152 mounting a toggle arrangement 154 which is actuated between an operative and an inoperative position by means of a solenoid 156 and a return spring 158, all of which will be described hereinafter in greater detail.

The barrier actuation mechanism 150 further comprises the barrier 160 which functions in the same manner as the barrier 142 hereinbefore described with respect to the operation of the secondary control member 122. The barrier actuation mechanism 150 is positioned adjacent the track 28 (FIG. 3) such that the barrier 160 may be positioned in the path of the secondary control member roller 128 to operate thereon in the aforementioned manner. As can best be seen in FIGS. 5, 6, and 7, the barrier actuation mechanism 150 has an upright support member 162 that is attached to the plate 152 by any suitable means such as a fastener 164 (FIG. 6) that extends through the upright support member 162 and into threaded engagement with the support plate 152. The upright support member 162 has an elongated vertical slot 164 (FIG. 6) through which is slidably disposed a support pin 166, the outer end of which pivotally carries the upper end of the movable barrier 160. The other end of the support pin 166 is pivotally fastened to the upper end of a link member 168, the opposite end of which is, in turn, pivotally coupled to a second link member 170. The link member 170 is pivotally attached to the lower end of the support member 162. The link 170 is operatively coupled to the solenoid 156 such that, upon actuation of the solenoid 156, the link 170 is moved toward the solenoid thereby creating a toggle action which results in the lowering of the pin 166 within the slot 164 whereby the upper end of the movable barrier 160 is lowered; and the movable barrier 160 is moved out of the path of travel of the secondary control member roller 128. Thus, the barrier 160 will have no effect on the operation of the control member 122. When the solenoid 156 is deactivated, the spring 158 exerts a biasing force on the toggle arrangement 154 to shift the links 170 and 168 back to the vertical position wherein the links 168 and 170 abut a stop 175 carried by the support member 162. In this position the barrier 160 is again positioned in the path of travel of the secondary control member roller 128. Because of the toggle arrangement, the barrier 160 may be moved from an operative to an inoperative position by means of a solenoid 156 whose power need only be of sufficient force to move the links while not having to overcome the force exerted on the fixed barrier 160 by its engagement with the roller 128, as the vertical arrangement of the toggle 154 will maintain the barrier 160 in its operative position without concern for downwardly directed forces thereon.

As can be seen in FIG. 3, the barrier actuation mechanism 150 is positioned adjacent to track 28 so as to engage the roller 128 of the secondary control member 122 to rotate the same in a counterclockwise direction to shift connecting member 64 in a leftwardly direction and thereby result in the pusher member 80 rotating to an inoperative position; that is, a position wherein the roller 104 of the pusher member 80 is not in engagement within the tray recess 112. In order to disengage the secondary control member 122 from the connecting member 64, that is, to rotate the control member 122 in a counterclockwise direction to permit the connecting member 64 to be shifted rightwardly into its operative position, a second barrier actuation mechanism 172 carried above the pusher mechanism 10 is positioned to engage the roller 128 when the same is in its elevated position, as shown in FIG. 2. Such an engagement shifts control member 122 downwardly to its lowered position and disengages the roller 132 from the projection recess 140 whereby the mechanism 10 operates in the aforementioned manner to raise the pusher member 80 to its operative position for engaging the recess 112 of a tray 24. The second barrier actuation mechanism 172 is identical in construction and operation to the barrier actuation mechanism 150; and, thus, a further detailed description is not necessary.

It can be seen that the novel barrier actuation mechanisms 150 and 172 permit the selective actuation and deactuation of a pusher member to provide for a number of situations wherein such actuation and deactuation of the pusher member is necessary, all of which have been explained in the prior art. It should also be noted that the prior art apparatuses require the use of a cam track and cam follower throughout the entire distance wherein it is desired that the pusher member be in an inoperative position, all of which is now eliminated by the present inventive control member 122 including the fixed barrier 142 and the movable barrier actuation mechanism 150.

It should also be noted that in certain applications it may be desirable to provide a plurality of the barrier actuation mechanisms 150 at selective locations throughout the conveyor system such that, in the event of a fire or other similar emergency, the solenoids 156 may be deactivated to cause the positioning of the movable barrier 160 into the path of travel of the secondary control member roller 128 whereby the entire system may be deactivated, or that portion of the system in the critical areas of operation may be deactivated as necessary.

Suitable sensing means, such as limit switches, for detecting the various tray positions and for controlling the operation of the solenoids associated with the barrier actuation mechanisms 150 and 172 have not been shown, since such devices and the control circuits in which they are incorporated are within the capacities of those skilled in the art.

It should be further noted that the surface 106 defined by the cantilevered beam spring 116 is but one example of supporting the pusher member 80, as other constructions may be employed to provide the necessary, flexible support. For example, as shown in FIG. 8, a support beam 180 has its left end pivotally mounted to connecting member 64 by means of coupling hinge 182, while the right end of the beam 116 is supported by a compression spring 184. The spring 184 has its opposite ends housed within seats 186 and 188, respectively, formed in the lower side of beam 180 and connecting member 64.

It should also be noted that, while the barrier mechanism 150 is illustrated in FIG. 5 as being biased by spring 158 to an operative position, the mechanism 150 may be normally set to be biased to an inoperative position such as illustrated in FIG. 6. This is accomplished by removing the stop 175 from the right side of the support member 162 (as viewed in FIG. 5) and replacing the stop on the left side of the support member 162, as shown in phantom lines at 175'. In this position the spring 158 will normally pivot the links toward the right and thereby lower the barrier 160. Actuation of the solenoid 156 will rotate links 168 and 170 back to the vertical position wherein the links 168 and 170 abut stop 175'. The barrier mechanism 150 will otherwise function as described hereinbefore.

It can thus be seen that the present invention has provided a new and improved pusher mechanism for conveyor systems, and it should be understood by those skilled in the art of such pusher mechanisms that other forms can be had all coming within the spirit of the invention and the scope of the appended claims.

What is claimed is as follows:

1. A conveyor including a support for providing a path along which trays are movable in a forwarding direction, each tray being drivingly engageable by one of a plurality of pusher members carried by a chain supported on a track located adjacent to the tray support, each pusher member being rotatably mounted on a housing attached to the chain and movable therewith, each pusher member being movable between driving and non-driving positions relative to the tray, wherein the improvement comprises:
   a connecting member mounted on the housing for reciprocal movement with respect to the pusher member to control the movement of the pusher member between the driving and non-driving positions relative to the tray;
   means urging the connecting member into a contacting engagement with said pusher member to urge said pusher member to an operative relation with a tray in which the pusher member is drivingly engageable;
   a control member pivotably mounted on the housing in advance of the pusher member with relation to the forwarding direction of tray movement, said connecting member connecting the control member to said pusher member such that, when the control member is engageable with an object such as a preceding tray overtaken by the control member, the control member is movable in response to such engagement to cause the connecting means to move to a non-contacting relationship with the pusher member whereby the pusher member moves to a non-driving position;
   a second control member operable independently of said first-mentioned control member for moving said connecting member out of a contacting engagement with said pusher member; and
   barrier means mounted adjacent to a portion of the chain-supporting track and momentarily engageable with said second control member such that said second control member lockingly engages said connecting member to move the same in a non-contacting position with respect to said pusher member whereby said pusher member is moved to said non-driving position, said second control member remaining in contact with said connecting member after said momentary engagement with said barrier.

2. The conveyor defined in claim 1 comprising second barrier means for engaging said second control member to move said second control member out of engagement with said connecting member, whereby said connecting member is moved into a contacting relationship with said pusher member and said pusher member is moved to said driving position.

3. The conveyor defined in claim 1 wherein said barrier is selectively movable into the path of travel of said second control member to move said second control member into a contacting engagement with said connecting member.

4. The conveyor defined in claim 3 wherein said movable barrier comprises:
   a support post having means connecting said barrier thereto;
   electromagnetic means; and
   said support post having means providing a toggle connection between the barrier and the support post by which the barrier is releasably locked in its operative position in the path of travel of said second control member, said electromagnetic means being operatively coupled to said toggle means and operable on actuation to move said barrier into an inoperative position out of the path of travel of said secondary control member.

5. The conveyor defined in claim 4 wherein said electromagnetic means is normally actuated for maintaining said barrier in an non-operating position out of the path of travel of said second control member.

6. A pusher mechanism for a conveyor system, said pusher mechanism comprising:
   a housing;
   a motion transmitting member reciprocally mounted within said housing between first and second positions;
   a pusher member rotatably mounted on said housing and movable between operative and non-operative positions in response to the position of said motion transmitting member such that said pusher member is in said operative position when said motion transmitting member is in said first position and said pusher member is in said nonoperative position when said motion transmitting member is in said second position;
   means biasing said motion transmitting member to said first position;
   a control member rotatably mounted on said housing ahead of said pusher member and adapted upon actuation to move said motion transmitting member to said second position; and
   a second control member carried by said housing and operable independently of said first-mentioned control member for lockingly engaging said motion transmitting member to move same to said second position and to maintain same in said second position.

7. The pusher mechanism for a conveyor system as defined in claim 6 wherein the conveyor system has a support for providing a path along which trays are movable in a forwarding direction, each tray being drivingly engageable by one of said pusher members carried by a chain supported on a track located adjacent to the tray support, each pusher member being carried by said chain and movable therewith;
   a barrier selectively movable to a first position into the path of travel of said second control member to actuate same and a second position out of the path of travel of said second control member;
   a support post having a toggle connection between the support post and said barrier by which the barrier is releasably locked in said first position in the path of travel of said second control member; and
   operating means coupled to said toggle connection and operable upon actuation to move said barrier to one of its positions and means biasing said toggle connection to move said barrier to the other of said positions.

8. The conveyor defined in claim 7 wherein said operating means moves said barrier to said first position, and said biasing means moves said barrier to said second position.

9. The conveyor defined in claim 7 wherein said biasing means moves said barrier to said first position, and said operating means moves said barrier to said second position.

10. A conveyor including a support for providing a path along which trays are movable in a forwarding direction, each tray being drivingly engageable by one of a plurality of pusher members carried by a chain supported on a track located adjacent to the tray support, each pusher member being rotatably mounted on a housing attached to the chain and movable therewith, each pusher member being movable between driving and non-driving positions relative to the tray, wherein the improvement comprises:

a connecting member mounted on the housing for reciprocal movement with respect to the housing, said connecting member being located forwardly of said pusher member and movable rearwardly to control the movement of the pusher member between the driving and non-driving positions relative to the tray, said connecting member having a pusher member supporting surface which engages and supports said pusher member;

said supporting surface is resiliently mounted to said connecting member for absorbing shock loads transmitted thereto from said pusher member;

means urging the connecting member rearwardly into a contacting engagement with said pusher member to urge and support said pusher member in an operative relation with a tray in which the pusher member is drivingly engageable; and a control member pivotably mounted on the housing in advance of the pusher member with relation to the forwarding direction of tray movement, said connecting member connecting the control member to said pusher member such that, when the control member is engageable with an object such as a preceding tray overtaken by the control member, the control member is movable in response to such engagement to cause the connecting means to move to a non-contacting relationship with the pusher member whereby the pusher member moves to a non-driving position.

11. The conveyor defined in claim 10 comprising:

a second control member operable independently of said first-mentioned control member for moving said connecting member out of a contacting engagement with said pusher member; and barrier means mounted adjacent to a portion of the chain-supporting track and momentarily engageable with said second control member such that said second control member lockingly engages said connecting member to move the same in a non-contacting position with respect to said pusher member whereby said pusher member is moved to said non-driving position, said second control member remaining in contact with said connecting member after said momentary engagement with said barrier.

12. The conveyor defined in claim 11 comprising second barrier means for engaging said second control member to move said second control member out of engagement with said connecting member, whereby said connecting member is moved into a contacting relationship with said pusher member and said pusher member is moved to said driving position.

13. The conveyor defined in claim 11 wherein said barrier is selectively movable into the path of travel of said second control member to move said second control member into a contacting engagement with said connecting member.

* * * * *